US012333741B2

(12) United States Patent
Wang et al.

(10) Patent No.: US 12,333,741 B2
(45) Date of Patent: Jun. 17, 2025

(54) NO-REFERENCE VISUAL MEDIA ASSESSMENT COMBINING DEEP NEURAL NETWORKS AND MODELS OF HUMAN VISUAL SYSTEM AND VIDEO CONTENT/DISTORTION ANALYSIS

(71) Applicant: IMAX CORPORATION, Waterloo (CA)

(72) Inventors: Zhou Wang, Waterloo (CA); Jiheng Wang, Waterloo (CA); Hojatollah Yeganeh, Waterloo (CA); Kaiwen Ye, North York (CA); Ahmed Badr, Waterloo (CA); Kai Zeng, Kitchener (CA)

(73) Assignee: IMAX CORPORATION, Mississauga (CA)

( * ) Notice: Subject to any disclaimer, the term of this patent is extended or adjusted under 35 U.S.C. 154(b) by 114 days.

(21) Appl. No.: 17/156,846

(22) Filed: Jan. 25, 2021

(65) Prior Publication Data

US 2021/0233259 A1    Jul. 29, 2021

Related U.S. Application Data

(60) Provisional application No. 62/966,767, filed on Jan. 28, 2020.

(51) Int. Cl.
*G06T 7/262* (2017.01)
*G06N 3/08* (2023.01)
(Continued)

(52) U.S. Cl.
CPC .............. *G06T 7/262* (2017.01); *G06N 3/08* (2013.01); *G06T 3/4053* (2013.01); *G06T 7/90* (2017.01);
(Continued)

(58) Field of Classification Search
CPC  G06N 3/08; G06N 3/04; G06N 3/045; G06N 3/084; G06N 3/042; G06N 20/20;
(Continued)

(56) References Cited

U.S. PATENT DOCUMENTS 8,712,157 B2 * 4/2014 Marchesotti ......... G06V 10/806
382/190
2014/0044197 A1 * 2/2014 Liao .................... H04N 21/2662
375/E7.2
(Continued)

FOREIGN PATENT DOCUMENTS

CN   105744256 A  *  7/2016
CN   108259893 A  *  7/2018   ............. H04N 17/00
(Continued)

OTHER PUBLICATIONS

Bosse et al., A Deep Neural Network for Image Quality Assessment, IEEE International Conference on Image Processing (ICIP), 2016.
(Continued)

*Primary Examiner* — Henok Shiferaw
*Assistant Examiner* — Woo C Rhim
(74) *Attorney, Agent, or Firm* — BROOKS KUSHMAN P.C.

(57) ABSTRACT

No-reference (NR) quality assessment (VQA) of a test visual media input encoding media content is provided. The test video visual media input is decomposed into multiple-channel representations. Domain knowledge is obtained by performing content analysis, distortion analysis, human visual system (HVS) modeling, and/or viewing device analysis. The multiple-channel representations are passed into deep neural networks (DNNs) producing DNN outputs. The DNN outputs are combined using domain knowledge to produce an overall quality score of the test visual media input.

40 Claims, 10 Drawing Sheets

(51) Int. Cl.
  *G06T 3/4053* (2024.01)
  *G06T 7/90* (2017.01)
  *G06T 15/10* (2011.01)

(52) U.S. Cl.
  CPC .... *G06T 15/10* (2013.01); *G06T 2207/20081* (2013.01)

(58) Field of Classification Search
  CPC ............... G06N 20/10; G06T 9/002; G06T 2207/20081; G06T 2207/20084; G06T 3/40; G06T 3/4046; G06T 2207/20021; G06T 7/0002; G06T 2207/30168; G06T 2207/10016; G06T 7/262; G06T 3/4053; G06T 7/90; G06T 15/10; H04N 19/17; H04N 19/176; H04N 19/154; H04N 19/147; H04N 21/23418; H04N 5/147; G06V 10/70; G06V 10/88; G06V 10/764; G06V 20/40; G06V 20/41; G06V 20/49; G06V 10/98; G06V 10/993; H04H 60/59; H04L 1/248
  See application file for complete search history.

(56) References Cited

U.S. PATENT DOCUMENTS

| | | | |
|---|---|---|---|
| 2016/0034786 A1* | 2/2016 | Suri | G06F 18/214 382/159 |
| 2016/0212432 A1* | 7/2016 | Wang | G06V 20/40 |
| 2016/0335754 A1* | 11/2016 | Aaron | H04N 21/4666 |
| 2016/0379352 A1 | 12/2016 | Zhang et al. | |
| 2017/0300785 A1* | 10/2017 | Merhav | G06F 18/2148 |
| 2018/0041788 A1* | 2/2018 | Wang | H04N 21/23805 |
| 2018/0300869 A1* | 10/2018 | Aaron | H04N 19/154 |
| 2019/0020871 A1* | 1/2019 | Xu | H04N 19/197 |
| 2019/0096032 A1 | 3/2019 | Li | |
| 2019/0246112 A1* | 8/2019 | Li | H04N 19/136 |
| 2019/0362484 A1* | 11/2019 | Po | G06N 5/046 |
| 2021/0385502 A1* | 12/2021 | Dinh | H04N 19/154 |
| 2022/0239925 A1* | 7/2022 | Topiwala | H04N 19/154 |

FOREIGN PATENT DOCUMENTS

| | | | | |
|---|---|---|---|---|
| CN | 108391121 A | * | 8/2018 | ........... G06T 7/0002 |
| KR | 20220123541 A | * | 9/2022 | |
| WO | WO-2017152274 A1 | * | 9/2017 | ......... H04L 41/5067 |

OTHER PUBLICATIONS

Kang et al., Convolutional Neural Networks for No-Reference Image Quality Assessment, IEEE Conference on Computer Vision and Pattern Recognition, 2014.

Yang et al., No-Reference Image Quality Assessment Based on Deep Learning Method, IEEE 3rd Information Technology and Mechatronics Engineering Conference (ITOEC), 2017.

Wang et al., Image Quality Assessment: From Error Visibility to Structural Similarity, IEEE Transactions on Image Processing, vol. 13, No. 4, Apr. 2004.

Wang et al., Video Quality Assessment Based on Structural Distortion Measurement, Signal Processing: Image Communication, vol. 19, No. 2, pp. 121-132, Feb. 2004.

Wang et al., Multi-Scale Structural Similarity for Image Quality Assessment, Proceedings of the 37th IEEE Asilomar Conference on Signals, Systems and Computers, Pacific Grove, CA, Nov. 9-12, 2003.

Wang et al., Information Content Weighting for Perceptual Image Quality Assessment, IEEE Transactions on Image Processing, vol. 20, No. 5, May 2011.

Pinson et al., A New Standardized Method for Objectively Measuring Video Quality, IEEE Transactions on Broadcasting, vol. 50, No. 3, pp. 312-322, Sep. 2004.

Li et al., Toward A Practical Perceptual Video Quality Metric, Netflix Tech Blog, 2017.

Rehman et al., Display Device-Adapted Video Quality-of-Experience Assessment, IS&T/SPIE Electronic Imaging: Human Vision & Electronic Imaging, Feb. 2015.

Guan et al., "Visual Importance and Distortion Guided Deep Image Quality Assessment Framework", IEEE Transactions on Multimedia, Nov. 2017, p. 2505-250, vol. 19, No. 11.

Li et al., "Quality Assessment of In-the-Wild Videos", MM '19: Proceedings of the 27th ACM International Conference on Multimedia, Oct. 2019, 9 pages.

Ravela et al., "No-Reference Image Quality Assessment Based on Deep Convolutional Neural Networks", Proc. of SPIE, 2019, 8 pages, vol. 10996.

* cited by examiner

NO-REFERENCE VISUAL MEDIA ASSESSMENT COMBINING DEEP NEURAL NETWORKS AND MODELS OF HUMAN VISUAL SYSTEM AND VIDEO CONTENT/DISTORTION ANALYSIS

CROSS-REFERENCE TO RELATED APPLICATION

This application claims the benefit of U.S. provisional application Ser. No. 62/966,767 filed Jan. 28, 2020, the disclosure of which is hereby incorporated in its entirety by reference herein.

TECHNICAL FIELD

Aspects of the disclosure generally relate to automated objective quality assessment of a test instance of visual media, such as a digital video or still image, without looking to a source image or video of pristine quality as reference, aiming to reproduce or best approximate human subjective visual assessment of video quality. Such a no-reference (NR) objective video quality assessment (VQA) method or system is applicable, for example, to any testing video stream that can be fully decoded to frames of video pixels. One application is in video distribution networks and systems, where the NR-VQA method and system of the present disclosure may be deployed at multiple monitoring points for quality control and optimization purposes. The present disclosure involves the combination of deep neural networks by machine learning approach and domain knowledge including models of the human visual system and analysis of the video content, video distortions, and viewing device and condition

BACKGROUND

Objective video quality assessment (VQA) methods predict the perceptual quality of a test video, targeted at reproducing or best approximating human visual subjective quality assessment of the video. Likewise, image quality assessment (IQA) methods predict the perceptual quality of a test image. Depending on the availability of a perfect-quality pristine original video as the reference, VQA methods may be classified into full-reference (FR), reduced-reference (RR) and no-reference (NR) methods. FR methods assume the reference video is fully accessible, RR methods assume that the reference video is partially available in the form of pre-computed features rather than video pixels, and NR methods (or sometimes referred to as blind methods) do not assume availability of the reference video.

SUMMARY

In a first illustrative embodiment, a method for no-reference (NR) quality assessment (VQA) of a test visual media input encoding media content is provided. The method includes decomposing the test visual media input into multiple-channel representations; obtaining domain knowledge by performing content analysis, distortion analysis, human visual system (HVS) modeling, and/or viewing device analysis; passing the multiple-channel representations into deep neural networks (DNNs) producing DNN outputs; and combining the DNN outputs using domain knowledge to produce an overall quality score of the test visual media input.

In one or more illustrative examples, a system for no-reference (NR) quality assessment (VQA) of a test visual media input encoding media content is provided. The system includes a computing device programmed to decompose the test visual media input into multiple-channel representations; obtain domain knowledge by performing content analysis, distortion analysis, human visual system (HVS) modeling, and/or viewing device analysis; pass the multiple-channel representations into deep neural networks (DNNs) producing DNN outputs; and combine the DNN outputs using domain knowledge to produce an overall quality score of the test visual media input.

DETAILED DESCRIPTION

Figure 1:
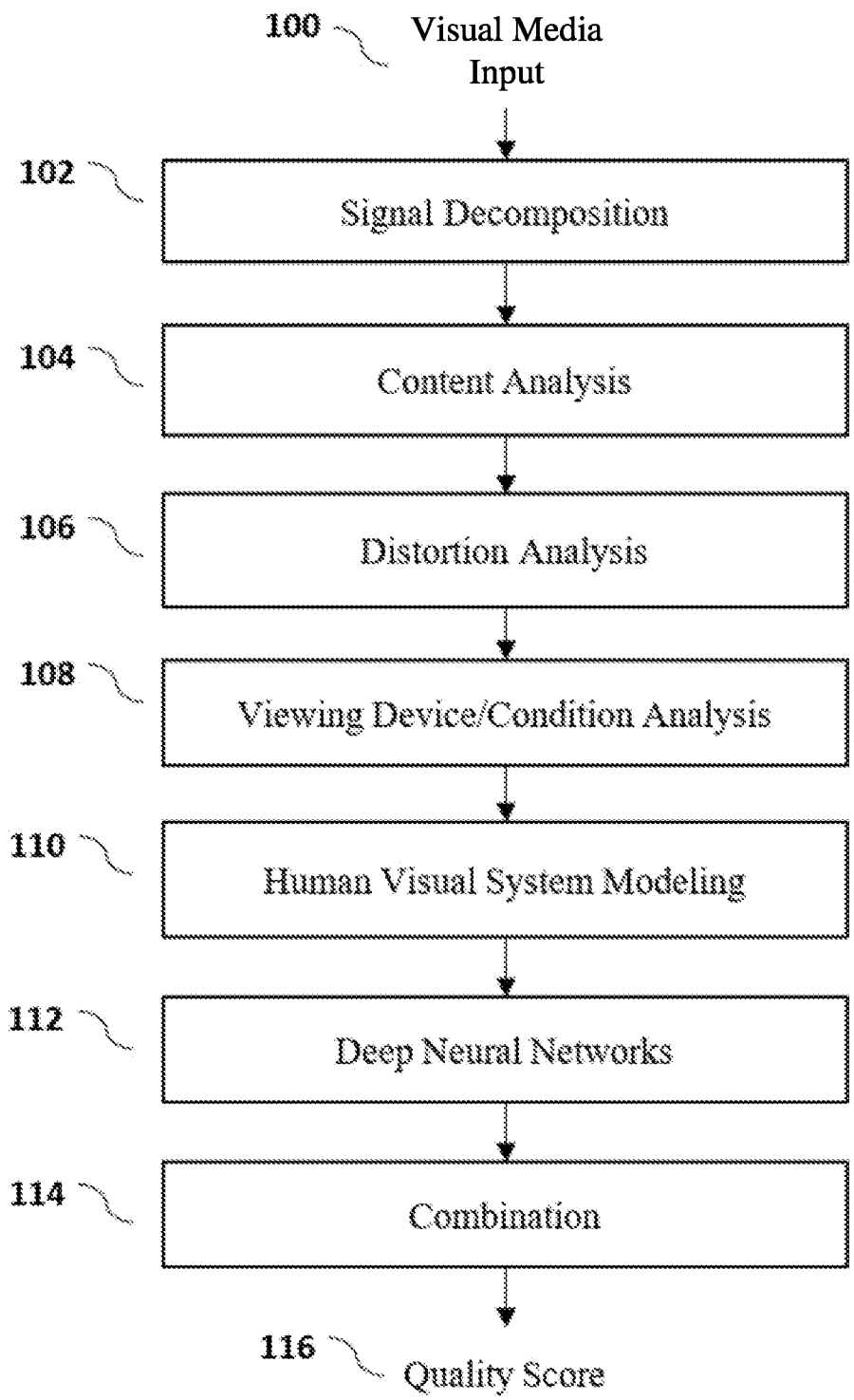
FIG. 1 illustrates the computational operations performed, in accordance with an embodiment of the disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Since VQA predicts the perceptual quality of a video, it may be used as an important component in the estimation of human visual quality-of-experience (QoE), which refers to the overall visual quality when human viewers experience the playback of the video streams on their specific viewing devices. VQA is often used as a measure of the presentation quality in the overall QoE assessment. Other factors that may contribute to viewers' QoE may include video transmission errors, freezing/stalling events caused by buffering/rebuffering, video decoding and network congestion issues, and quality switching in adaptive bitrate (ABR) streaming processes, etc.

In many real-world video distribution networks, reference video is unavailable in many points inside the network where video quality desires to be monitored. In such cases, NR-VQA methods are beneficial. The desired properties of such NR-VQA methods include accuracy, speed, cost, and interpretability. First, the NR-VQA method should produce video quality scores that accurately predict viewer experiences. Second, the NR-VQA method should have low computational and implementation cost. Third, the NR-VQA method should also be easily interpretable, producing quality scores that directly relate to what an average viewer would say about the quality of a video. As such, the NR-VQA method creates an easy-to-grasp common language, allowing smooth communication in large organizations, where engineers and operators can identify and fix quality problems on the fly, researchers and developers can optimize individual components and the overall video delivery systems, and executives can make critical business decisions.

The present disclosure relates to automated objective NR-VQA of a test video without looking to a source video of pristine quality as reference, aiming to reproduce or best approximate human subjective visual assessment of video quality. Such an NR-VQA method or system is applicable to any video stream that can be fully decoded to frames of video pixels. For example, in a video distribution network or system, the testing points range from the source (e.g., from video production houses, content providers, broadcasters, satellites, cloud-based systems, and other sources), through multiple video distribution stages (encoding, transcoding, packaging, transmission through cable, satellite, IPTV, Internet, content delivery networks (CDNs), edge servers, wireless access, wifi networks, etc.), to final user devices (on TVs, tablets, smart phones, desktop computers, etc.). The use of automated objective NR-VQA may play a beneficial role in video distribution networks and systems for quality control and performance/cost optimization purposes.

The present disclosure combines data-driven deep neural networks (DNNs) trained by machine learning approaches and domain-knowledge that includes models of the human visual system (HVS) and analysis of video content and video distortions. Generally speaking, data-driven approaches rely on big data from a certain domain and use machine learning approaches to train a predictive model or system that aims to produce desired output. In the case of NR-VQA, the desired output is human visual evaluation of video quality, and thus, labeling of the training data that approximate visual perception is desirable. However, obtaining enough labeled data for training may be extremely expensive, and limited training data often leads to overfitting problems. On the other hand, knowledge-driven approaches do not fully rely on labeled data. Instead, these approaches are built upon prior domain-knowledge, including computational models of the HVS, the viewing device, the viewing condition, the video content, and/or the video distortion processes. These models lack the flexibility to adapt to specific video samples where the content and/or distortions are not properly addressed by the domain-knowledge. Therefore, a key aspect of the present disclosure is on various disclosed systems and methodologies that combine the advantages of both data-driven (using DNN and machine learning) and knowledge-driven (based on HVS models, viewer device, viewing condition, video content, and video distortion analysis) approaches. It should be noted that, while many of the illustrative examples relate to video, the described techniques are applicable to other types of visual media, such as still images.

FIG. 1 illustrates an example of computation operations that are performed in accordance with an embodiment of the disclosure. One of the most desirable aspects in the present disclosure is the combination of data-driven and knowledge-driven approaches in NR-VQA. As shown, given a visual media input 100 whose quality is to be assessed, the visual media input 100 first passes through a signal decomposition operation 102, which decomposes the signal into multiple channels of different spatial scales/resolutions, frequency bands, temporal resolutions, spatiotemporal channels, content types, complexity levels, distortion types, luminance levels, and/or bit-depths (the number of bits used to represent each color channel of a pixel). A content analysis operation 104 is then applied to classify the visual media into one of multiple categories of content types, and complexity types and levels. This is followed by a distortion analysis operation 106, which detect the types and levels of the distortions that the visual media had passed through before. Next, a viewing device/condition analysis operation 108 is performed to obtain viewing device and viewing condition parameters. This is followed by a human visual system (HVS) modeling operation 110 that takes the above analysis steps as input parameters. One or multiple deep neural networks (DNNs) 112 are then applied to the decomposed signals at multiple channels. Finally, a combination operation 114 combines the analysis and modeling results in operations 104, 106, 108, 110 with the DNN 112 outputs to produce a final quality score 116 of the visual media input.

Figure 2:
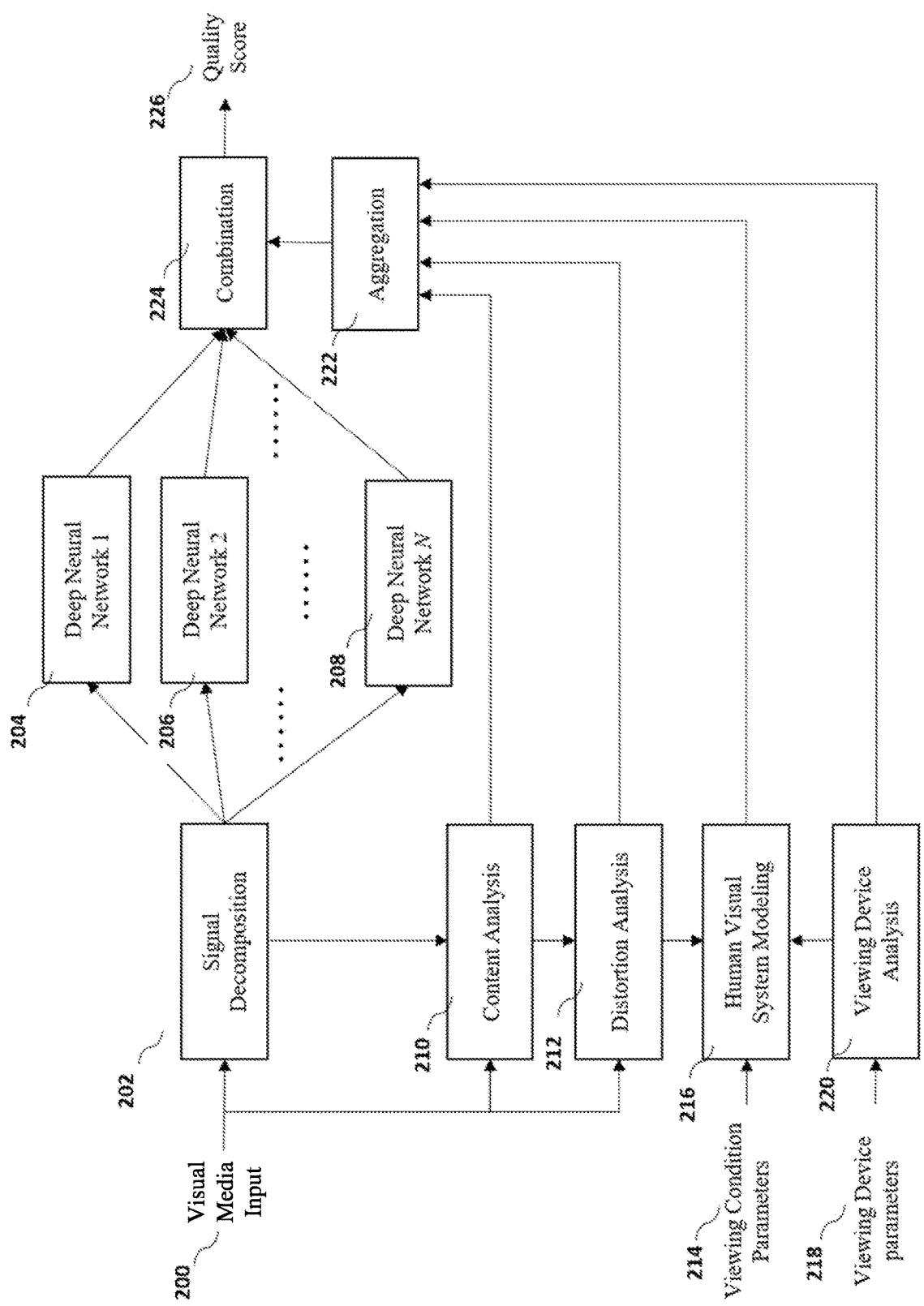
FIG. 2 illustrates the computational modules and the data flow diagram, in accordance with an embodiment of the disclosure.

FIG. 2 illustrates another embodiment of the present disclosure, in which the visual media input 200 passes through a signal decomposition process 202 that transforms the signal into multiple channels (N channels in total), similar to as performed in the signal decomposition operation 102. For each channel, a deep neural network (DNN) 204, 206, 208 is used to produce a channel-specific quality prediction (N DNNs in total). This prediction may be, for instance, in the form of a scalar quality score or of a quality parameter vector. The signal decomposition results also aid in the analysis of the visual media input 200 in the content analysis process 210. The distortion analysis process 212 is then applied to identify the distortions and artifacts in the visual media input 200. Viewing device parameters 214 and viewing condition parameters 218 may be obtained separately and used for HVS modeling 216 and viewing device analysis 220 processes. An aggregation process 222 collects all the information from the outputs of 210, 212, 216 and 220, and performs an aggregation to provide aggregate data used to guide the combination process 224 of all DNN outputs, in turn producing an overall quality score 226 of the visual media input 200.

Figure 3:
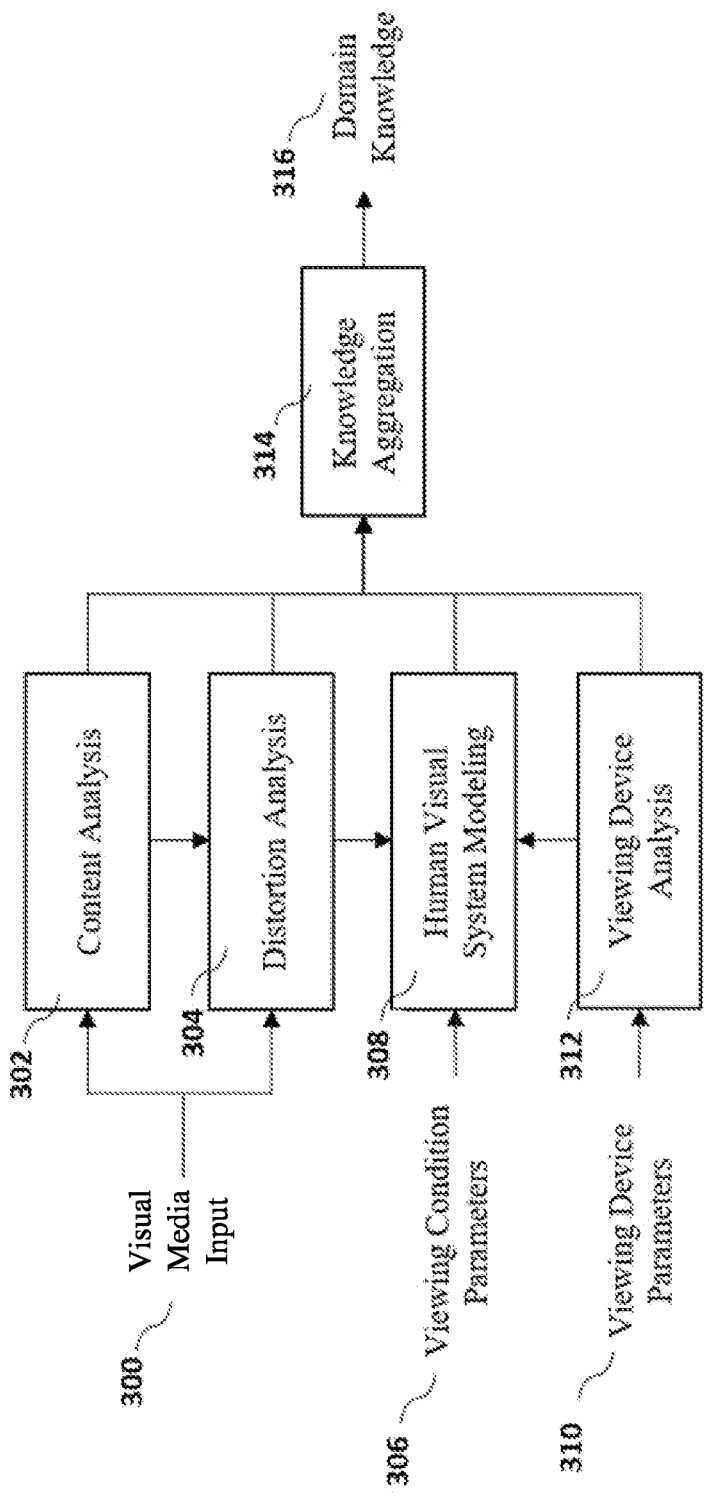
FIG. 3 illustrates the framework and data flow diagram of domain-knowledge model computation and knowledge aggregation process, in accordance with an embodiment of the disclosure.

FIG. 3 illustrates yet another embodiment of the present disclosure, illustrating domain-knowledge model computation and knowledge aggregation processes. As shown, the visual media input 300 is first fed into a content analysis module 302. The content analysis module 302 may perform content analysis, including, for instance, content type classification and content complexity assessment. In an example, the media content of the visual media input 300 may be classified into one or more of the categories of sports, animation, screen content, news, show, drama, documentary, action movie, advertisement, etc. The content may also be classified based on signal activities or complexities. For example, based on the visual media's spatial information content (strength and spread of fine texture details, sharp edge features, and smooth regions), temporal information content (amount and speed of camera and object motion), color information content (diversities in hue and saturation), and/or noise level (camera noise, film grain noise, synthesized noise, etc.), the video input may be classified into high, moderate, or low complexity categories for each of these criteria.

The visual media input 300 is also provided through a distortion analysis module 304, where the distortions and visual artifacts in the visual media input 300 are detected and the distortion levels are evaluated. The causes of distortions may include different types of lossy video compression (such as MPEG-1, MPEG-2, MPEG-4, H.261, H.263, H.264/AVC, H.265/HEVC, DV, VC-1, AV1, VPx, AVSx, FVC, VVC, Motion JPEG, Motion JPEG2000, Pro-Res, Theora, DNxHD, RealVideo RVx0, and other types of image/video compression standards) and errors occur during image acquisition, encoding, decoding, transmission, color space conversion, color sampling, spatial scaling, denoising, contrast enhancement, frame rate change, color and dynamic range tone mapping, and rendering. The appearance of visual artifacts may include blur, blocking, macroblocking, banding, ringing, noise, color shift, skin tone shift, color bleeding, exposure shift, contrast shift, highlight detail loss, shadow detail loss, texture loss, fake texture, flickering, jerkiness, jittering, floating, etc. The distortion analysis process may detect and quantify one or more of these artifacts, or produce visibility probability estimation of each of the visual artifacts.

The viewing condition parameters 306 may be obtained separately from the visual media input 300. The viewing condition parameters 306 may include the viewing distance and lighting condition of the viewing environment. They are used by the HVS models 308 to quantify the visibility of distortions and artifacts. The computational HVS models 308 may incorporate the contrast sensitivity function (CSF) of the visual system, which measures the human visual signal, contrast or error sensitivity as a function of spatial and temporal frequencies and may be functions of the luminance of the display and viewing environment. The HVS model may also incorporate visual luminance masking, which measures the visibility variation of signals due to surrounding luminance levels. The HVS model may also incorporate the visual contrast/texture masking, which measures the reduction of distortion/artifact visibility according to the strength and contrast of signals nearby in terms of spatial and temporal location, spatial and temporal frequency, and texture structure and orientation. The HVS model may also incorporate visual saliency and attention models, which estimate the likelihood/probability of each spatial and temporal location in the visual media that will attract visual attention and fixations. The HVS model may also incorporate visibility models of specific artifacts of blur, blocking, banding, ringing, noise, color shift, skin tone shift, color bleeding, exposure shift, contrast shift, highlight detail loss, shadow detail loss, texture loss, fake texture, flickering, jerkiness, jittering, floating, etc.

The viewing device parameters 310 may also be obtained separately from the visual media input 300. The viewing device parameters 310 may include device type and model, screen size, media window size, resolution, brightness, bit depth, and contrast ratio. These parameters are used by the viewing device analysis module 312 for device category classification, and are fed into the HVS modeling module 308 as input.

The results of content analysis 302, distortion analysis 304, HVS modeling 308, and viewing device analysis 312 are collected by the knowledge aggregation module 314, 222, which outputs aggregated domain knowledge 316 to be combined 224 with data-driven DNN results.

Figure 9:
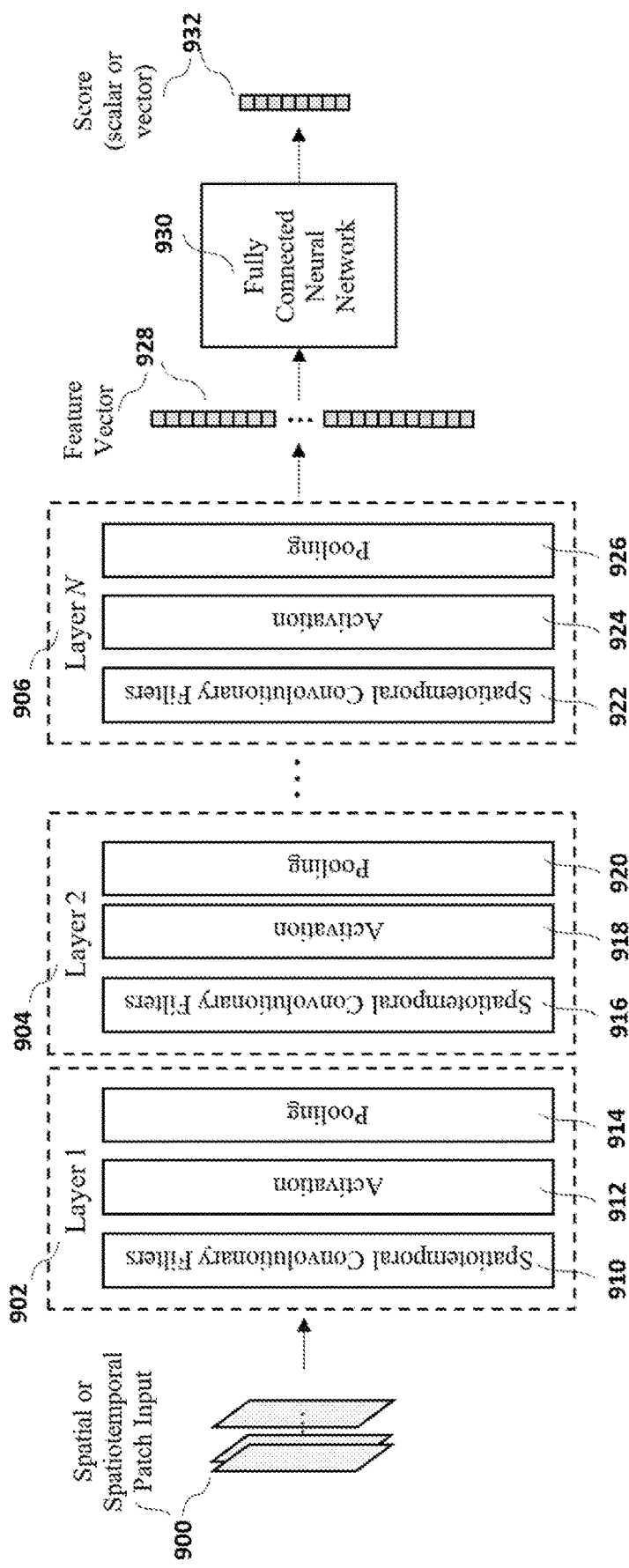
FIG. 9 illustrates an example of DNN architecture, in accordance with an embodiment of the disclosure.

FIG. 9 illustrates an example DNN architecture, in accordance with an embodiment of the disclosure. As shown, the input to the DNN is a patch 900 extracted from the visual media input. The patch input may be spatial or spatiotemporal. Specifically, it may be a 2D patch of square, rectangular, or other shape, and it may also be a 3D patch that stacks the 2D patch of multiple consecutive frames to a 3D volume.

The first part of the DNN contains multiple convolutional layers 902, 904, 906. In each layer, multiple spatial or spatiotemporal convolutional linear filters 910, 916, 922 are first applied, followed by a non-linear activation function 912, 918, 924 applied on the filter outputs. The coefficients that define the filters are often called weights in the network. Examples of the activation functions include Step, Ramp, Rectified Linear Unit (ReLU), Sigmoid and generalized divisive normalization (GDN) functions.

A pooling method 914, 920, 926 may be applied after the activation that may reduce the dimensionality of the signal. Examples of the pooling methods include mean pooling (MeanPool) or max pooling (MaxPool). After the signal passes through multiple convolutional layers, the output is reorganized into a feature vector 928, which is fed into a fully connected neural network 930 to produce the final output of a quality score in scalar or vector form 932. The weights or filters in each convolutional layer and inside the fully-connected neural network 930 may be trained jointly by back-propagation of a loss function applied at the network output, where examples of the loss function may be defined based on mean squared error (MSE), SSIM (e.g., as discussed in "Image quality assessment: from error visibility to structural similarity," Z. Wang, A. C. Bovik, H. R. Sheikh, and E. P. Simoncelli, *IEEE Transactions on Image Processing*, April 2004; "Video quality assessment based on structural distortion measurement," Z. Wang, L. Lu, and A. C. Bovik, *Signal Processing: Image Communication*, February 2004), MS-SSIM (e.g., as discussed in "Multi-scale structural similarity for image quality assessment," Z. Wang, E. P. Simoncelli and A. C. Bovik, *IEEE Asilomar Conference on Signals, Systems and Computers*, November 2003), IW-SSIM (e.g., as discussed in "Information content weighting for perceptual image quality assessment," Z. Wang and Q. Li, *IEEE Transactions on Image Processing*, May 2011), VQM (e.g., as discussed in "A new standardized method for objectively measuring video quality," M. H. Pinson, *IEEE Transactions on Broadcasting*, September 2004), VMAF (e.g., as discussed in "Toward a practical perceptual video quality metric," Z. Li, A. Aaron, I. Katsavounidis, A. Moorthy and M. Manohara, *Netflix TechBlog*, June 2016), SSIM-PLUS (e.g., as discussed in "Display device-adapted video quality-of-experience assessment," A. Rehman, K. Zeng and Z. Wang, *IS&T/SPIE Electronic Imaging: Human Vision &*

*Electronic Imaging*, February 2015), maximum likelihood and cross entropy. After training, the DNN may be applied to many 2D or 3D patches extracted from an image or video input using a pixel-by-pixel, frame-by-frame sliding window approach or with jumping steps, and the scores may be aggregated by averaging or weighted averaging to summarize the evaluation of the visual media input.

In one or more embodiments of the present disclosure, the combination process 114, 224 may use an average or weighted average of the scores produced by multiple DNNs. The weights may be guided by the domain knowledge 316 obtained from knowledge aggregation 314. For example, the domain knowledge may be used to determine the relevance (in terms of a likelihood or probability measure) of each of the DNN score in the final contribution of visual media quality, and the likelihood or probability can be used to decide the weight applied to the specific DNN score. The combination process 114, 224 may also be a feedforward neural network, a support vector regression (SVR), or other machine learning-based regression operation trained by a human subject or FR-VQA rated video database.

Figure 4:
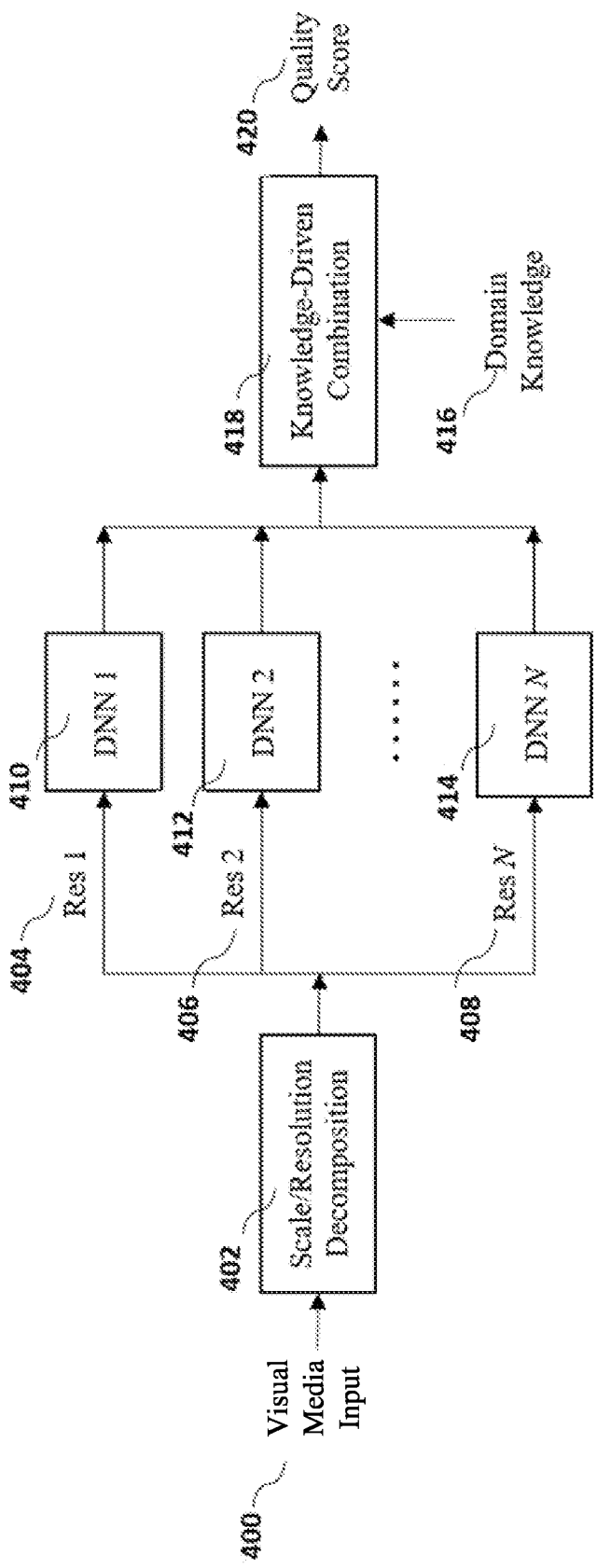
FIG. 4 illustrates the framework and data flow diagram of scale/resolution visual media decomposition followed by per-resolution channel DNN computations and domain-knowledge driven combination, in accordance with an embodiment of the disclosure.

FIG. 4 illustrates the framework and data flow diagram of scale/resolution visual media decomposition followed by per-resolution channel DNN computations and domain-knowledge driven combination. Here, the signal decomposition 202 method may be a scale/resolution decomposition 402 that transforms the visual media input 400 into multi-scale or multi-resolution representations, e.g., as Res 1 (404), Res 2 (406), . . . , Res N (408) as shown. Examples of the decomposition methods include Fourier transforms, the discrete cosine transform (DCT), the discrete sine transform (DST), the wavelet transform, the Gabor transform, the Haar transform, the Laplacian pyramid transform, the Gaussian pyramid transform, the steerable pyramid transform, and other types of frequency decomposition, spatial-frequency decomposition, multi-scale decomposition, and multi-resolution decomposition methods.

The multi-scale multi-resolution representations are fed into a series of DNNs 410, 412, 414, and their outputs are combined using a knowledge-driven approach 418 that is guided by domain knowledge 416, resulting in final quality score 420 of the visual media input 400. An example of the domain knowledge 416 used here is the importance or weights created through HVS modeling 308 that predicts the visual relevance of each of the multi-scale multi-resolution representations.

Figure 5:
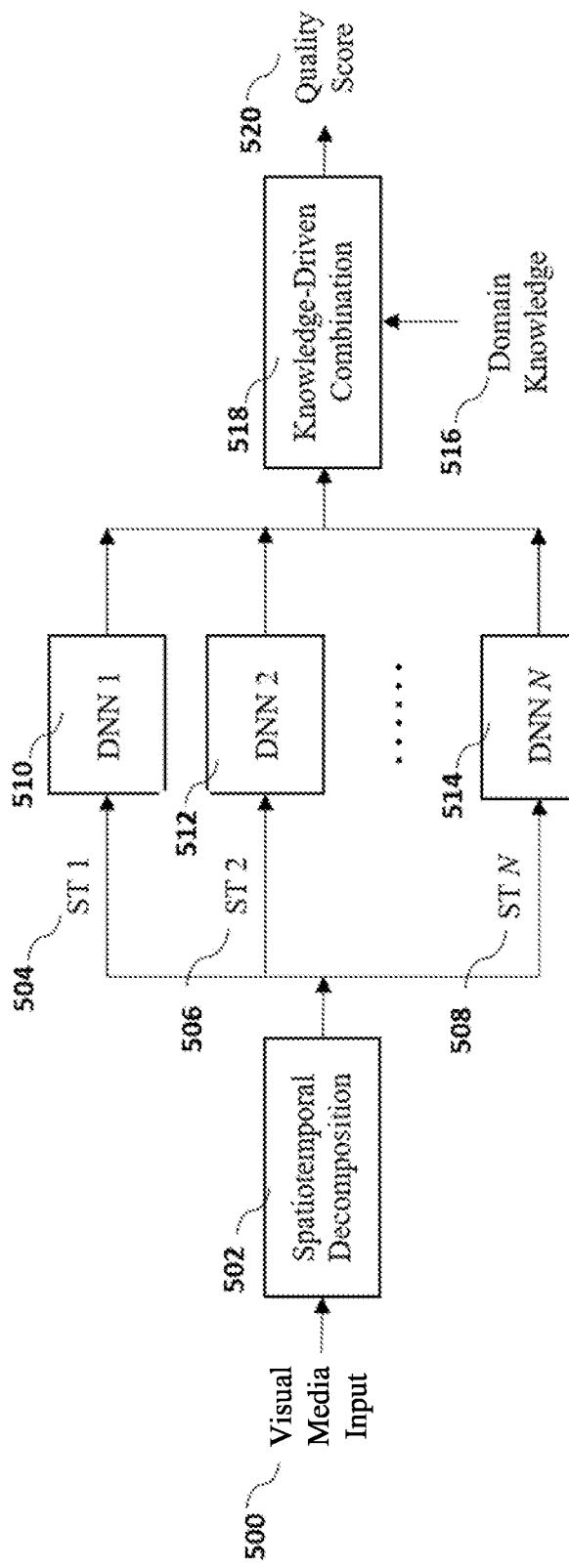
FIG. 5 illustrates the framework and data flow diagram of spatiotemporal decomposition followed by per-spatiotemporal channel DNN computations and domain-knowledge driven combination, in accordance with an embodiment of the disclosure.

FIG. 5 illustrates the framework and data flow diagram of spatio/spatiotemporal decomposition followed by per-spatio/spatiotemporal channel DNN computations and domain-knowledge driven combination. Here, the signal decomposition 202 method may be a spatiotemporal decomposition 502 that transforms the visual media input 500 into multiple spatiotemporal channel representations, e.g., as ST 1 (504), ST 2 (506), . . . , ST N (508) as shown. Examples of the decomposition methods include 2D/3D Fourier transforms, 2D/3D DCT, 2D/3D wavelet transform, 2D/3D Gabor transform, 2D/3D Haar transform, 2D/3D Laplacian and Gaussian pyramid transforms, and other types of spatial-temporal-frequency and 2D/3D oriented decomposition methods. For video, these transforms or decompositions may be applied to multiple consecutive frames, or a group-of-picture (GoP).

The spatio/spatiotemporal channel representations are fed into a series of DNNs 510, 512, 514, and their outputs are combined using a knowledge-driven approach 518 that is guided by domain knowledge 516, resulting in final quality score 520 of the visual media input 500. An example of the domain knowledge 516 used here is the importance or weights created through spatio/spatiotemporal HVS modeling 308 that predicts the visual relevance of each of the spatio/spatiotemporal channel representations.

Figure 6:
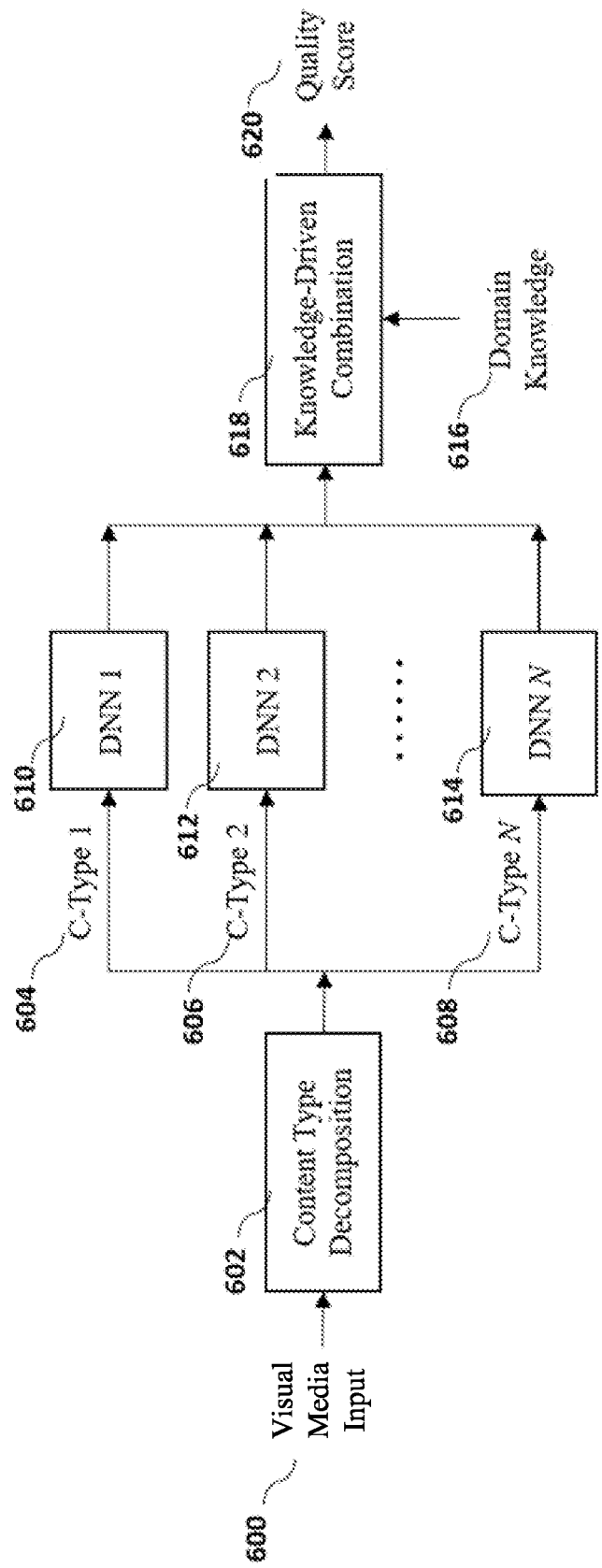
FIG. 6 illustrates the framework and data flow diagram of content analysis based visual media decomposition followed by per-content type DNN computations and domain-knowledge driven combination, in accordance with an embodiment of the disclosure.

FIG. 6 illustrates the framework and data flow diagram of content analysis based visual media decomposition followed by per-content type DNN computations and domain-knowledge driven combination. Here, the signal decomposition 202 method may be a content type decomposition 602 that transforms the visual media input 600 into multiple representations, e.g., as C-Type 1 (604), C-Type 2 (606), . . . , C-Type N (608) as shown. One example of the decomposition method is to classify and segment the scenes or frames of the visual media into different content categories, such as sports, animation, screen content, news, show, drama, documentary, action movie, advertisement, etc. Another example of the decomposition method is to classify and segment the scenes or frames of the visual media input 600 into different content complexity categories, such as high, moderate, and low complexity categories in terms of one or more of the visual media input 600 spatial information content (strength and spread of fine texture details, sharp edge features, and smooth regions), temporal information content in the case of NR-VQA (amount and speed of camera and object motion), color information content (diversities in hue and saturation), and/or noise level (camera noise, film grain noise, synthesized noise, etc.).

The C-Type representations are fed into a series of DNNs 610, 612, 614, and their outputs are combined using a knowledge-driven approach 618 that is guided by domain knowledge 616, resulting in final quality score 620 of the visual media input 600. An example of the domain knowledge 616 used here is the importance and/or weights created through content analysis 302 that predicts the likelihood of the content types and the importance of each content type in the overall quality assessment.

Figure 7:
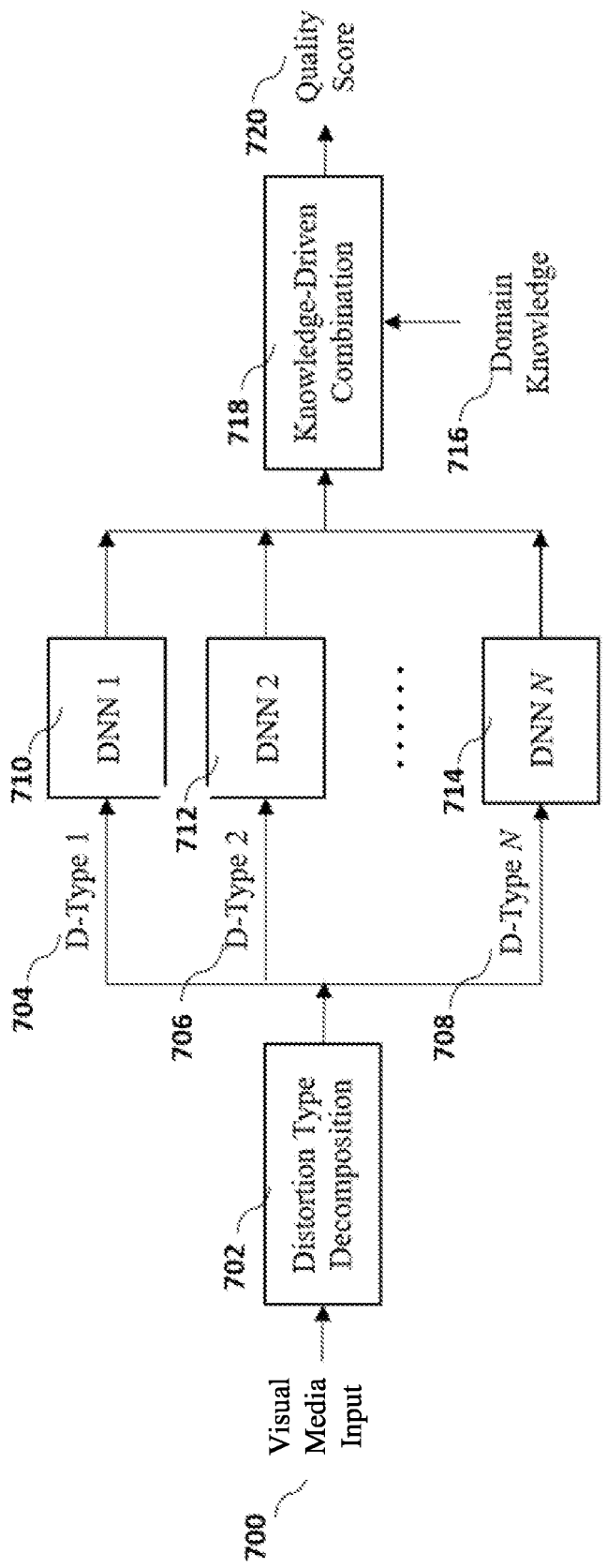
FIG. 7 illustrates the framework and data flow diagram of distortion analysis based visual media decomposition followed by per-distortion type DNN computations and domain-knowledge driven combination, in accordance with an embodiment of the disclosure.

FIG. 7 illustrates the framework and data flow diagram of distortion analysis based visual media decomposition followed by per-distortion type DNN computations and domain-knowledge driven combination. Here, the signal decomposition 202 method may be a distortion type decomposition 702 that transforms the visual media input 700 into multiple representations, e.g., as D-Type 1 (704), D-Type 2 (706), . . . , D-Type N (708) as shown. One example of the decomposition method for a video visual media input 700 is to segment the video into scenes or groups of pictures (GoPs), each of which is associated with an assessment on the likelihoods of containing each of a list of distortion types. Such distortion types may include one or more of blur, blocking, banding, ringing, noise, color shift, color bleeding, skin tone shift, exposure shift, contrast shift, highlight detail loss, shadow detail loss, texture loss, fake texture, flickering, jerkiness, jittering, floating, etc.

The D-Type representations are fed into a series of DNNs 710, 712, 714, and their outputs are combined using a knowledge-driven approach 718 that is guided by domain knowledge 716, resulting in final quality score 720 of the visual media input 700. An example of the domain knowledge 716 used here is the importance and/or weights created through distortion analysis 304 that predicts the likelihood of the distortion types and the importance of each distortion type in the overall quality assessment.

Figure 8:
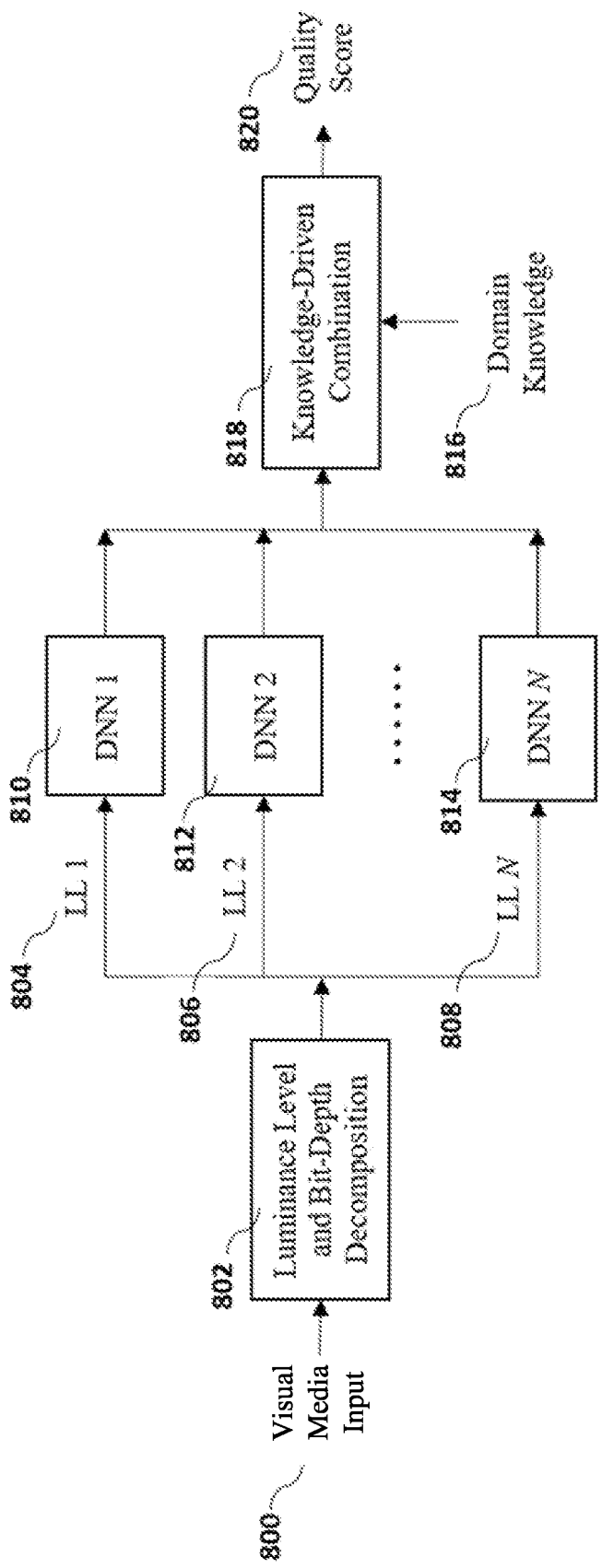
FIG. 8 illustrates the framework and data flow diagram of luminance-level and bit-depth based visual media decomposition followed by per luminance-level and bit-depth DNN computations and domain-knowledge driven combination, in accordance with an embodiment of the disclosure.

FIG. 8 illustrates the framework and data flow diagram of luminance-level and bit-depth based video decomposition followed by per luminance-level and bit-depth DNN computations and domain-knowledge driven combination. Here, the signal decomposition 202 method may be a luminance level and bit-depth decomposition 802 that transforms the visual media input 800 into multiple representations, e.g., as luminance level (LL) 1 (804), LL 2 (806), . . . , LL N (808) as shown. One example of the decomposition method is to segment the video scenes or frames into different regions, each of which is associated with a range of luminance levels or bit-depths.

The LL representations are fed into a series of DNNs 810, 812, 814, and their outputs are combined using a knowledge-driven approach 818 that is guided by domain knowledge 816, resulting in final quality score 820 of the visual media input 800. An example of the domain knowledge 816 used here is the importance and/or weights created through viewing device analysis 312, HVS modeling 308, and distortion analysis 304 that assess the importance of each luminance level or bit-depth in the overall quality assessment.

The NR-VQA and/or NR-IQA methods and systems in the present disclosure may have many applications. An example of its application field is video distribution networks such as cable, satellite, IPTV, Internet, and content delivery networks (CDNs).

Figure 10:
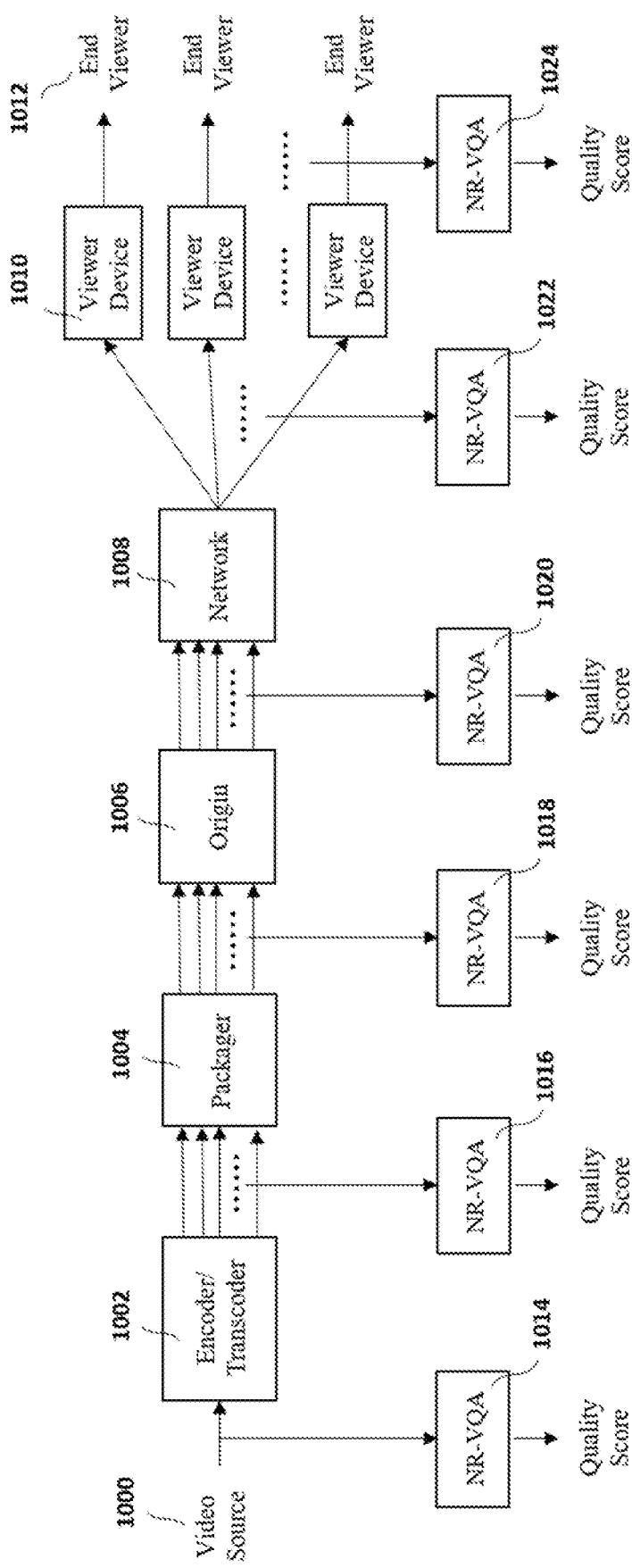
FIG. 10 illustrates an example of a video distribution system and the potential points of deployment of NR-VQA method and system, in accordance with an embodiment of the disclosure.

FIG. 10 illustrates an example of a video distribution system and the potential points of deployment of a NR-VQA method and system. As shown, the visual media as a video source 1000 passes through many middle stages before it reaches the end viewers, including encoding/transcoding 1002, packaging 1004, storing at origin 1006, distribution through the network 1008, arriving at the viewing devices 1010, and being rendered and seen by end viewers 1012. The video source 1000 may be in one or more of many video formats, for example, SDI, transport stream, multicast IP, or mezzanine files from content producers/providers. The NR-VQA method and system in the present disclosure may be applied at many points in the video delivery network, at the source input as shown at 1014, after encoder/transcoder as shown at 1016, after the packager as shown at 1018, at the origin as shown at 1020, during network distribution as shown at 1022, and after rendered at the end viewers' devices as shown at 1024.

An instance of video content provided by the video source 1000 may include, as some examples, live video feeds from current events, prerecorded shows or movies, and advertisements or other clips to be inserted into other video feeds. The video content may include just video in some examples, but in many cases the video further includes additional content such as audio, subtitles, and metadata information descriptive of the content and/or format of the video. The video distribution system may include one or more sources of instances of video content.

The one or more encoder/transcoder 1002 may receive the video content. The encoders/transcoders 1002 may include electronic circuits and/or software configured to compress the video content into a format that conforms with one or more standard video compression specifications. Examples of video encoding formats include MPEG-2 Part 2, MPEG-4 Part 2, H.264 (MPEG-4 Part 10), HEVC, Theora, RealVideo RV40, VP9, and AV1. In many cases, the compressed video lacks some information present in the original video, which is referred to as lossy compression. A consequence of this is that decompressed video may have a lower quality than the original, uncompressed video.

The encoder/transcoder 1002 may also include electronic circuits and/or software configured to re-encode the video content from a source format, resolution, and/or bit depth into an instance of video content with a different format, resolution, and/or bit depth. In many examples, the encoder/transcoder 1002 may be used to create, for each received instance of video content, a set of time-aligned video streams, each with a different bitrate and frame size. This set of video streams may be referred to as a ladder or compression ladder. It may be useful to have different versions of the same video streams in the ladder, as downstream users may have different bandwidth, screen size, or other constraints. As shown, the encoders/transcoders 1002 are integrated, but in other examples the encoder and transcoder functions are performed by are separate components.

The packager 1004 may have access to the ladders for each of the instances of video content. The packager 1004 may include hardware and/or software configured to create segmented video files to be delivered to clients that then stitch the segments together to form a contiguous video stream. The segmented video may include video fragments, as well as a manifest that indicates how to combine the fragments. The packager 1004 may sometimes be integrated into the encoder/transcoder 1002 that first creates the digital encoding of the instance of video content, but often it is a separate component. In one example, the encoder/transcoder 1002 and packager 1004 may be located in a media data center between the head-end and the content delivery network 1008.

The packager 1004 may provide the packaged video content to one or more origins 1006 to the content delivery network 1008. The origins 1006 refer to a location of the content delivery network 1008 to which video content enters the content delivery network 1008. In some cases, the packagers 1004 serve as origins 1006 to the content delivery network 1008, which in other cases, the packagers 1004 push the video fragments and manifests into the origins 1006. The content delivery network 1008 may include a geographically-distributed network of servers and data centers configured to provide the video content from the origins 1006 to destination viewer devices 1010. The viewer devices 1010 may include, as some examples, set-top boxes connected to televisions or other video screens, tablet computing devices, and/or mobile phones. Notably, these viewer devices 1010 may have different viewing condition (including illumination and viewing distance, etc.), spatial resolution (e.g., SD, HD, full-HD, UHD, 4K, etc.), frame rate (15, 24, 30, 60, 120 frames per second, etc.), dynamic range (8 bits, 10 bits, and 12 bits per pixel per color, etc.). The viewer device 1010 may execute a video player to play back the video content received to the viewer device 1010 from the content delivery network 1008.

As far as quality assurance is concerned, the user experience measured at the very end of the chain may matter most. However, only measuring QoE at the very end may be insufficient to help localize problems that could occur at any point along the video distribution chain of the system. Therefore, to ensure the video is faithfully and smoothly delivered to the viewer device 1010, a quality assurance approach may include NR-VQA inspector components deployed at the viewer device 1010 and also at each of the transition points along the video distribution chain. In one example, NR-VQA inspector component 1014 is deployed at the video source 1000, NR-VQA inspector component 1016 is deployed after the encoder/transcoder 1002, NR-VQA inspector component 1018 is deployed after the packager 1004, NR-VQA inspector component 1020 is deployed at the origin 1006, NR-VQA inspector component 1022 is deployed at during network 1008 distribution, and NR-VQA inspector component 1024 is deployed after rendered at the end viewers' devices 1010. To perform the system monitoring, the NR-VQA inspector components 1014, 1016, 1018, 1020, 1022, 1024 may include hardware and/or software configured to perform the NR-VQA operations described in detail herein. Thus, applying the NR-VQA inspector components at multiple monitoring points provides a good overview about the performance of the video distribution network, and helps identify and address quality problems during video distribution.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for no-reference (NR) quality assessment (VQA) of a test visual media input encoding media content, comprising:
    decomposing the visual media input into multiple channel representations;
    obtaining domain knowledge by performing content analysis, distortion analysis, human visual system (HVS) modeling, and/or viewing device analysis, including performing the HVS modeling by using viewing condition and device parameters and incorporating HVS sensitivity function, luminance masking, contrast masking, texture masking, visual attention, and fixation properties into the HVS modeling;
    passing the multiple channel representations into deep neural networks (DNNs) producing DNN outputs; and
    combining the DNN outputs using the domain knowledge to produce an overall quality score of the test visual media input.

2. The method of claim 1, further comprising, in obtaining the domain knowledge, performing the content analysis by classifying the test visual media input into different content type categories and/or classifying the test visual media input into different complexity categories.

3. The method of claim 1, further comprising, in obtaining the domain knowledge, performing the distortion analysis by detecting different distortion types in the test visual media input and classifying the test visual media input based on distortion type categories or estimating likelihoods of the distortion types.

4. The method of claim 1, further comprising, in obtaining the domain knowledge, performing the viewing device analysis using viewing device parameters.

5. The method of claim 1, further comprising aggregating the content analysis, the distortion analysis, the HVS modeling, and the viewing device analysis into the domain knowledge.

6. The method of claim 1, further comprising, using one or more of average, weighted average, feedforward neural networks, or support vector regression approaches to combine the DNN outputs and the domain knowledge to produce the overall quality score.

7. The method of claim 1, wherein the multiple channel representations include multiple scale or resolution channels, and further comprising:
using a scale or resolution decomposition to transform the test visual media input into multi-scale multi-resolution representations;
passing the multi-scale multi-resolution representations into the DNNs; and
combining the DNN outputs using the domain knowledge based on the HVS modeling, wherein the HVS modeling predicts visual relevance of each of the multi-scale multi-resolution representations.

8. The method of claim 7, further comprising using one or more of Fourier transforms, discrete cosine transform (DCT), discrete sine transform (DST), wavelet transform, Gabor transform, Haar transform, Laplacian pyramid transform, Gaussian pyramid transform, or steerable pyramid transform to transform the test visual media input into the multi-scale multi-resolution representations.

9. The method of claim 1, wherein the multiple channel representations include multiple spatiotemporal channels, and further comprising:
using a spatiotemporal decomposition to transform the test visual media input into multiple spatiotemporal channel representations;
passing the multiple spatiotemporal channel representations into the DNNs; and
combining the DNN outputs using the domain knowledge based on spatiotemporal HVS modeling that predicts visual relevance of each of the spatiotemporal channel representations.

10. The method of claim 9, further comprising using one or more of 3D Fourier transforms, 3D DCT, 3D wavelet transform, 3D Gabor transform, 3D Haar transform, 3D Laplacian pyramid transform, or 3D Gaussian pyramid transform for performing the spatiotemporal decomposition.

11. The method of claim 1, wherein the multiple channel representations include multiple content type channels, and further comprising:
using a content type decomposition to transform the test visual media input into content type representations in terms of segments of different content categories and/or complexity categories;
passing the content type representations into the DNNs; and
combining the DNN outputs using the domain knowledge based on content analysis that predicts likelihood and importance of the content categories and/or complexity categories.

12. The method of claim 11, further comprising, with respect to the content type decomposition, classifying the test visual media input into high, moderate, and low complexity categories in terms of one or more of spatial information content, temporal information content, color information content, and/or noise level of the test visual media input.

13. The method of claim 1, wherein the multiple channel representations include multiple distortion type channels, and further comprising:
using a distortion type decomposition to transform the visual media input into distortion type representations in terms of video segments each associated with likelihoods of containing each of a list of distortion types;
passing the distortion type representations into the DNNs; and
combining the DNN outputs using the domain knowledge based on distortion analysis that predicts likelihood and importance of each distortion type.

14. The method of claim 1, wherein the multiple channel representations include multiple luminance level and bit-depth channels, and further comprising:
using a luminance level and bit-depth decomposition to transform the visual media input into multiple luminance level representations;
passing the luminance level representations into the DNNs; and
combining the DNN outputs using the domain knowledge based on viewing device analysis, the HVS modeling, and distortion analysis that assess importance of each luminance level or bit-depth.

15. The method of claim 1, further comprising applying the NR-VQA method at multiple monitoring points in a video distribution network to provide an overview of network performance, for use in identifying and addressing quality issues during video distribution.

16. The method of claim 1, wherein the visual media input is a still image.

17. The method of claim 1, wherein the visual media input is a video including a sequence of a plurality of frames.

18. The method of claim 1, further comprising obtaining domain knowledge by performing at least two of the content analysis, the distortion analysis, the human visual system (HVS) modeling, and/or the viewing device analysis.

19. The method of claim 1, further comprising, in obtaining the domain knowledge, performing the content analysis by classifying the visual media input into different complexity categories based on at least two of spatial information content, temporal information content, color information content, and/or noise level of the test visual media input.

20. The method of claim 1, further comprising categorizing the media content based on signal activities or complexities, wherein the further categorization is based on one or more of spatial scales/resolutions, frequency bands, temporal resolutions, spatial temporal channels, image frame complexity levels, image frame distortion types, image frame luminance levels and image frame bit depths representations.

21. The method of claim 1, further comprising:
classifying a category type of each scene of image frames of the test visual media input, segment the image frames into multiple channels of image frames based on the category type to produce the multiple channel representations, the category type being based on a descriptive term or terms of a scene image independent of signal activities or complexities within the image frames, wherein the category type includes one or more of: sports scenes; news scenes; action movie scenes; drama scenes; advertisement scenes; documentary scenes; or animation scenes.

22. A system for no-reference (NR) quality assessment (VQA) of a test visual media input encoding media content, comprising:
a computing device programmed to
decompose the test visual media input into multiple channel representations;
obtain domain knowledge by performing content analysis, distortion analysis, human visual system (HVS) modeling, and/or viewing device analysis, including to perform the HVS modeling by using viewing condition and device parameters and to incorporate HVS sensitivity function, luminance masking, contrast masking, texture masking, visual attention, and fixation properties into the HVS modeling;
pass the multiple channel representations into deep neural networks (DNNs) producing DNN outputs; and
combine the DNN outputs using the domain knowledge to produce an overall quality score of the test visual media input.

23. The system of claim 22, wherein the computing device is further programmed to, in obtaining the domain knowledge, perform the content analysis by classifying the test visual media input into different content type categories and/or classifying the visual media input into different complexity categories.

24. The system of claim 22, wherein the computing device is further programmed to, in obtaining the domain knowledge, perform the distortion analysis by detecting different distortion types in the test visual media input and classifying the visual media input based on distortion type categories or estimating likelihoods of each of the distortion types.

25. The system of claim 22, wherein the computing device is further programmed to, in obtaining the domain knowledge, perform the viewing device analysis using viewing device parameters.

26. The system of claim 22, wherein the computing device is further programmed to aggregate the content analysis, the distortion analysis, the HVS modeling, and the viewing device analysis into the domain knowledge.

27. The system of claim 22, wherein the computing device is further programmed to use one or more of average, weighted average, feedforward neural networks, or support vector regression approaches to combine the DNN outputs and the domain knowledge to produce the overall quality score.

28. The system of claim 22, wherein the multiple channel representations include multiple scale or resolution channels, and the computing device is further programmed to:
use a scale or resolution decomposition to transform the visual media input into multi-scale multi-resolution representations;
pass the multi-scale multi-resolution representations into the DNNs; and
combine the DNN outputs using the domain knowledge based on the HVS modeling, wherein the HVS modeling predicts a visual relevance of each of the multi-scale multi-resolution representations.

29. The system of claim 28, wherein the computing device is further programmed to use one or more of Fourier transforms, discrete cosine transform (DCT), discrete sine transform (DST), wavelet transform, Gabor transform, Haar transform, Laplacian pyramid transform, Gaussian pyramid transform, or steerable pyramid transform to transform the test visual media input into the multi-scale multi-resolution representations.

30. The system of claim 22, wherein the multiple channel representations include multiple spatiotemporal channels, and the computing device is further programmed to:
use a spatiotemporal decomposition to transform the test visual media input into multiple spatiotemporal channel representations;
pass the multiple spatiotemporal channel representations into the DNNs; and
combine the DNN outputs using the domain knowledge based on spatiotemporal HVS modeling that predicts visual relevance of each of the spatiotemporal channel representations.

31. The system of claim 30, wherein the computing device is further programmed to use one or more of 3D Fourier transforms, 3D DCT, 3D wavelet transform, 3D Gabor transform, 3D Haar transform, 3D Laplacian pyramid transform, or 3D Gaussian pyramid transform to perform the spatiotemporal decomposition.

32. The system of claim 22, wherein the multiple channel representations include multiple content type channels, and the computing device is further programmed to:
use a content type decomposition to transform the test visual media input into content type representations in terms of segments of different content categories and/or complexity categories;
pass the content type representations into the DNNs; and
combine the DNN outputs using the domain knowledge based on content analysis that predicts likelihood and importance of the content categories and/or complexity categories.

33. The system of claim 32, wherein the computing device is further programmed to, with respect to the content type decomposition, classify the test visual media input into high, moderate, or low complexity categories in terms of one or more of spatial information content, temporal information content, color information content, and/or noise level of the test visual media input.

34. The system of claim 22, wherein the multiple channel representations include multiple distortion type channels, and the computing device is further programmed to:
use a distortion type decomposition to transform the visual media input into distortion type representations in terms of video segments each associated with respective likelihoods of containing each of a list of distortion types;
pass the distortion type representations into the DNNs; and
combine the DNN outputs using the domain knowledge based on distortion analysis that predicts likelihood and importance of each distortion type.

35. The system of claim 22, wherein the multiple channel representations include multiple luminance level and bit-depth channels, and the computing device is further programmed to:
use a luminance level and bit-depth decomposition to transform the visual media input into multiple luminance level representations;
pass the luminance level representations into the DNNs; and
combine the DNN outputs using the domain knowledge based on viewing device analysis, the HVS modeling, and distortion analysis that assess importance of each luminance level or bit-depth.

36. The system of claim 22, wherein the computing device is further programmed to apply the NR-VQA method at multiple monitoring points in a video distribution network to provide an overview of network performance, for use in identifying and addressing quality issues during video distribution.

37. The system of claim 22, wherein the visual media input is a still image.

38. The system of claim 22, wherein the visual media input is a video including a sequence of a plurality of frames.

39. The system of claim 22, further comprising categorizing the media content based on signal activities or complexities, wherein the further categorization is based on one or more of spatial scales/resolutions, frequency bands, temporal resolutions, spatial temporal channels, image frame complexity levels, image frame distortion types, image frame luminance levels and image frame bit depths representations.

40. The system of claim 22, wherein the computing device is further programmed to:
  classify a category type of each scene of image frames of the test visual media input, segment the image frames into multiple channels of image frames based on the category type to produce the multiple channel representations, the category type being based on a descriptive term or terms of a scene image independent of signal activities or complexities within the image frames,
  wherein the category type includes one or more of: sports scenes; news scenes; action movie scenes; drama scenes; advertisement scenes; documentary scenes; or animation scenes.

* * * * *